United States Patent
Novak et al.

Patent Number: 5,573,103
Date of Patent: Nov. 12, 1996

[54] SPEED ADJUSTING APPARATUS FOR CONTAINERS

[75] Inventors: John Novak, Butler; Lloyd Stivison, West Sunbury, both of Pa.

[73] Assignee: AGR International, Inc., Butler, Pa.

[21] Appl. No.: 328,479

[22] Filed: Oct. 24, 1994

[51] Int. Cl.$^6$ ............................................. B65G 15/14
[52] U.S. Cl. ........................ 198/604; 198/626.1; 198/843
[58] Field of Search ................................ 198/379, 604, 198/626.1, 842, 459.8

[56] References Cited

U.S. PATENT DOCUMENTS

| | | | |
|---|---|---|---|
| 1,719,404 | 7/1929 | Townsend | 198/626.1 X |
| 3,211,278 | 10/1965 | Arndt | 198/843 |
| 3,905,177 | 9/1975 | Herzog | 198/379 X |
| 3,938,653 | 2/1976 | Senger | 198/379 X |
| 4,064,987 | 12/1977 | Rowan | 198/604 |
| 4,778,999 | 10/1988 | Fisher | 250/461.1 |
| 4,791,287 | 12/1988 | Fisher | 250/223 B |
| 4,801,319 | 1/1989 | Rugaber et al. | 65/29 |
| 4,899,573 | 2/1990 | Dimmick et al. | 73/49.2 |
| 4,987,768 | 1/1991 | Dimmick et al. | 73/37.5 |
| 5,090,557 | 2/1992 | Larmen | 198/626.1 |
| 5,097,216 | 3/1992 | Dimmick et al. | 324/671 |
| 5,251,742 | 10/1993 | Campbell | 198/843 X |

FOREIGN PATENT DOCUMENTS

| | | | |
|---|---|---|---|
| 0647597 | 11/1928 | France | 198/626.1 |
| 6404770 | 2/1965 | Netherlands | 198/626.1 |
| 0897383 | 5/1962 | United Kingdom | 198/604 |

Primary Examiner—James R. Bidwell
Attorney, Agent, or Firm—Arnold B. Silverman; Eckert Seamans Cherin & Mellott

[57] ABSTRACT

Container handling apparatus includes container speed adjusting apparatus which cooperates with drive apparatus to sequentially deliver a plurality of containers into contact with the container speed adjusting apparatus. The container speed adjusting apparatus has one or more resiliently compressible components which facilitate alteration of the translational speed of the container, as well as alteration of the rotation thereof. Among the preferred approaches to providing such resiliently compressible components are to have endless belts supported and driven by primary pulleys with secondary resiliently compressible pulleys in engagement with the belt and disposed between the primary pulleys. The endless belts may be provided with specifically configured resiliently deformable portions, such as weakened portions in the belt, openings in the belt, or radially outwardly projecting elements. In general, a pair of container speed adjusting apparatus units will be employed and will be so spaced that the size of the path therebetween is less than the diameter of the container at the point where the container speed adjusting apparatus will contact the container. If desired, both container speed adjusting apparatus units may have essentially the same construction. In one embodiment, a resiliently compressible wheel is provided in lieu of one or both of the units having the endless belts. In a preferred practice, the container speed adjusting apparatus is employed to reduce the translational speed and rotation of the containers which may be bottles or jars made of plastic or glass.

8 Claims, 10 Drawing Sheets

SPEED ADJUSTING APPARATUS FOR CONTAINERS

BACKGROUND OF THE INVENTION

1. Field of the Invention

The present invention relates to apparatus for adjusting the speed of containers which are moving through container handling or processing equipment.

2. Description of the Prior Art

It has long been known to inspect bottles and cans prior to introduction of food products, beverages or other products into the container in order to remove defective containers so as to avoid waste of the product to be packaged therein. See, generally, U.S. Pat. Nos. 4,778,999; 4,791,287; 4,801,319; 4,899,573; and 4,987,768;. Typical of the containers subjected to such inspection have been glass bottles, plastic bottles, and metal cans.

It has also been known to inspect containers on a high speed continuous basis, as distinguished from sampling, for proper thickness, shape, and the presence of foreign matter. See, generally, U.S. Pat. Nos. 4,778,999; 4,791,287 and 5,097,216.

It has also been known when delivering containers from an inspection station or other source to conveyor means or another destination that it may be desired to adjust the speed of the containers as they move sequentially toward the destination. It has been known to use slowdown apparatus for such purposes. Typically, such systems provide a pair of units each disposed on opposite sides of the path through which the containers will pass. Each have a pair of vertically spaced endless belts each of which is supported by a pair of pulleys, one of which is driven so as to establish the desired orbital belt speed.

One of the difficulties with existing slowdown systems is that they are substantially rigid with most of the parts being made of metal and the bottle contacting portions of the endless belts being made of rubber which is of high hardness. This can create problems with respect to jamming the system by containers which are substantially out of shape or oversized. Such problems can also result in fracturing or other damage to the containers. Also, such systems experience enhanced wear of the belt supporting metal pulleys. While it has been known to employ spring loaded belt supporting pulleys, these have high manufacturing costs and require a high level of maintenance.

It has also been known to employ in slowdown apparatus, urethane belts having circumferential projections and also belts having a plurality of radial projections with the gap between adjacent projections being less than the circumferential width of the projections with openings being provided in the projections and in adjacent belt portions.

There remains, therefore, a real and substantial need for container speed adjusting apparatus which will efficiently and safely effect the desired speed adjustment in a durable manner which will resist damaging the containers.

SUMMARY OF THE INVENTION

The present invention has met the above-described need by providing several approaches to introducing compressibly resilient materials into the container speed adjusting means so as to cause effective interengagement between the container and the container speed adjusting means and, thereby, attain more effective control over the speed adjustment. The speed adjustment generally being sought will be a reduction in speed of the container to approximate that of the conveyor to which the container is being delivered.

In one embodiment of the present invention, the container handling means has container speed adjusting means and drive means for sequentially delivering a plurality of the containers into contact with the container speed adjusting means. The speed adjusting means has endless belt means for contacting the container and a pair of primary pulleys disposed interiorly of and support the endless belts with one of the primary pulleys being driven so as to establish the desired orbital movement of the endless belts. A plurality of resiliently compressive secondary belt supporting pulleys are provided in engagement with the endless belt adjacent to the path of travel of the containers so as to resiliently yield when a container passes by the container speed adjusting means.

In general, a pair of speed adjusting units is so spaced as to define a path for travel of the container which is less than the diameter of the portion of the container which will engage the speed adjusting apparatus. This difference in dimension may be employed to both reduce the speed of the container and reduce or terminate axial rotation of the container.

In another embodiment of the invention, resiliently compressible wheels may be substituted for the orbiting belts on one or both units so as to serve a similar function.

In yet another embodiment of the invention, the orbiting belt or belts may be provided with uniquely configurated resiliently compressible regions which may consist of weakened zones, openings in the belt, generally radially outwardly projecting resilient elements or combinations thereof.

It is an object of the present invention to provide an improved, durable container speed adjusting means for handling a wide variety of containers including glass bottles, plastic bottles and metal containers so as to efficiently alter the speed and rotation characteristics of the container.

It is yet another object of the present invention to provide such equipment which is readily employable with existing high speed container handling and processing equipment.

It is a further object of the present invention to provide such a system which employs resiliently compressible elements so as to facilitate efficient non-damaging alteration of a containers translational and rotational speed.

It is a further object of the present invention to provide container speed reduction apparatus which has resiliently compressive components having weakened zones or openings to enhance resiliency of the component.

It is an object of the invention to provide cushioning in the container speed adjusting apparatus to enhance the useful life of all belt supporting pulleys.

These and other objects of the invention will be more fully understood from the following description of the invention on reference to the illustrations appended hereto.

DESCRIPTION OF THE PREFERRED EMBODIMENTS

In the present invention, the resiliently compressible elements of the container speed adjusting apparatus may result solely from the compressible resiliency of the material or in the preferred form, will be enhanced by providing weakened zones, openings, or discrete elements that are resilient.

As employed herein, the expression "weakened zone" means a reduced thickness zone of an article, as well as a hole or opening in the article and any other alterations in configuration which will enhance the compressive resiliency of the article above and beyond that inherent in the material out of which the article is made.

Speed control is important for a proper transition of inspected containers being delivered to a conveyor for further transport. The problem is particularly acute as modem container inspection may be performed at very high speeds which may be on the order of about 250 to 400 containers a minute and the conveyor receiving the containers after inspection generally is moving at a slower speed. The containers must, therefore, be slowed down before transfer from the inspection zone to the conveyor.

Figure 1:
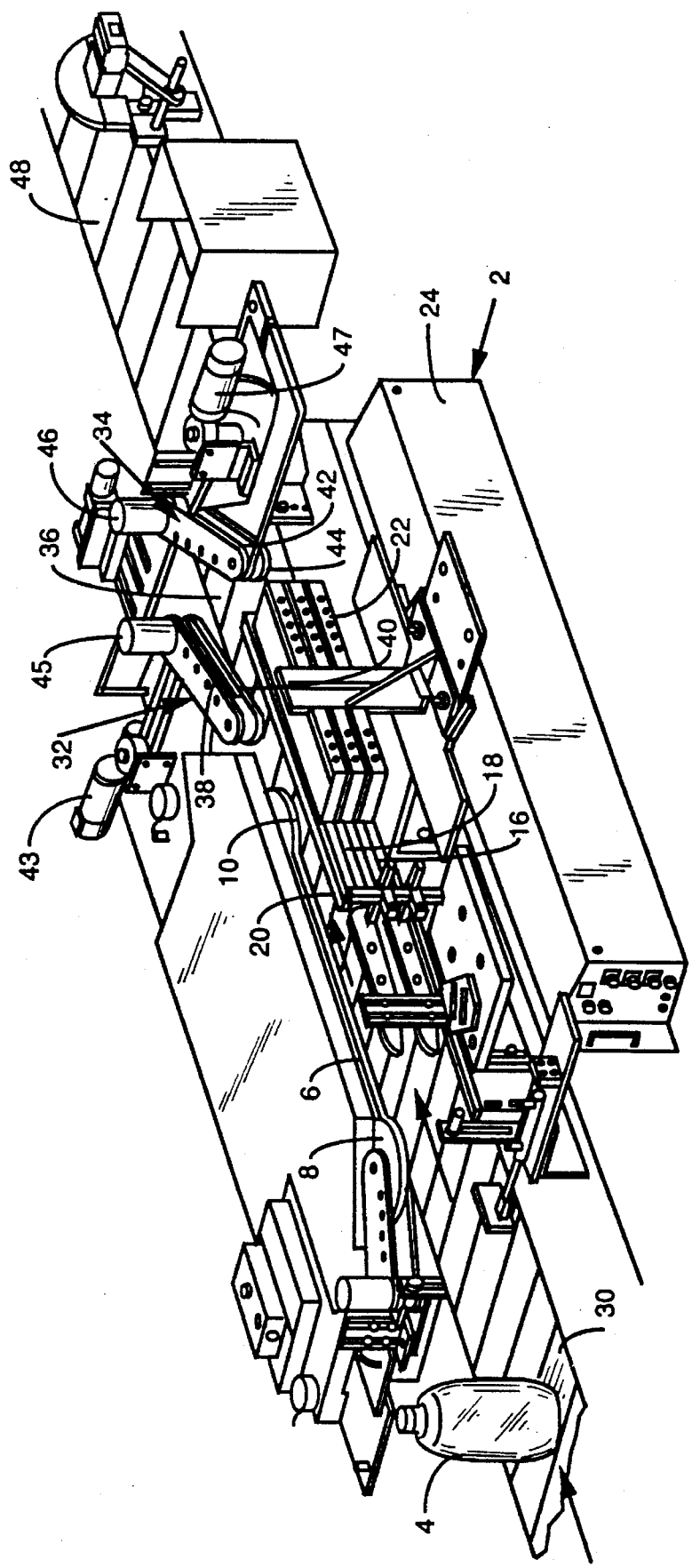
FIG. 1 is a perspective view showing generally a container inspection station of the type disclosed in U.S. Pat. No. 5,097,216 and an associated pair of container speed reducing units.

Referring to FIG. 1, there is shown schematically an on-line thickness inspection system 2 which may be of the type shown in U.S. Pat. No. 5,097,216 wherein a plurality of containers, such as bottle 4, are sequentially moved in the direction shown by the arrow and driven therethrough under the influence of belt 6 which is orbited under the influence of pulleys 8, 10. In inspecting bottles by this system, the bottles, such as 4, will be subjected to translational movement in the direction of the arrow and also axial rotational movement as they move across a plurality of elongated capacitive sensors 16, 18, 20 to provide electrical input for the processing units 22, 24 to make determinations regarding thickness as conveyor 30 transports the containers, such as 4, to the inspection unit.

In the form shown, a pair of container speed adjusting units 32, 34 are relatively spaced from each other to provide a path 36 which is of smaller width than the diameter of the portion of the container which will be contacted by the units 32, 34. In the first embodiment of the invention, each unit 32, 34 will have a pair of vertically spaced orbiting belts moving in the same direction as the containers. More specifically, the belts on unit 34 will move in a clockwise direction and the belts on unit 32 will move in a counterclockwise direction to establish a container speed generally the same as that of the conveyor 48 to which the containers will be delivered. The belts on unit 32 are indicated generally by the reference numbers 38, 40 and the belts on unit 34 are indicated generally by reference numbers 42, 44. The containers emerging from the path 36 disposed between units 32, 34 will be received on moving conveyor 48 and will emerge at a speed approximating that of conveyor 48 and without meaningful axial rotation. Container speed adjusting unit 32 is generally referred as the drive side unit and unit 34 is generally referred to as the head side unit. The belt supporting primary pulleys which will be described in greater detail hereinafter on the units 32, 34 are respectively driven by motors 43, 47 which may conveniently be of the fractional horsepower adjustable speed type. Shown secured to the top of units 32, 34, respectively, are a pair of guards 45, 46.

Figure 2:
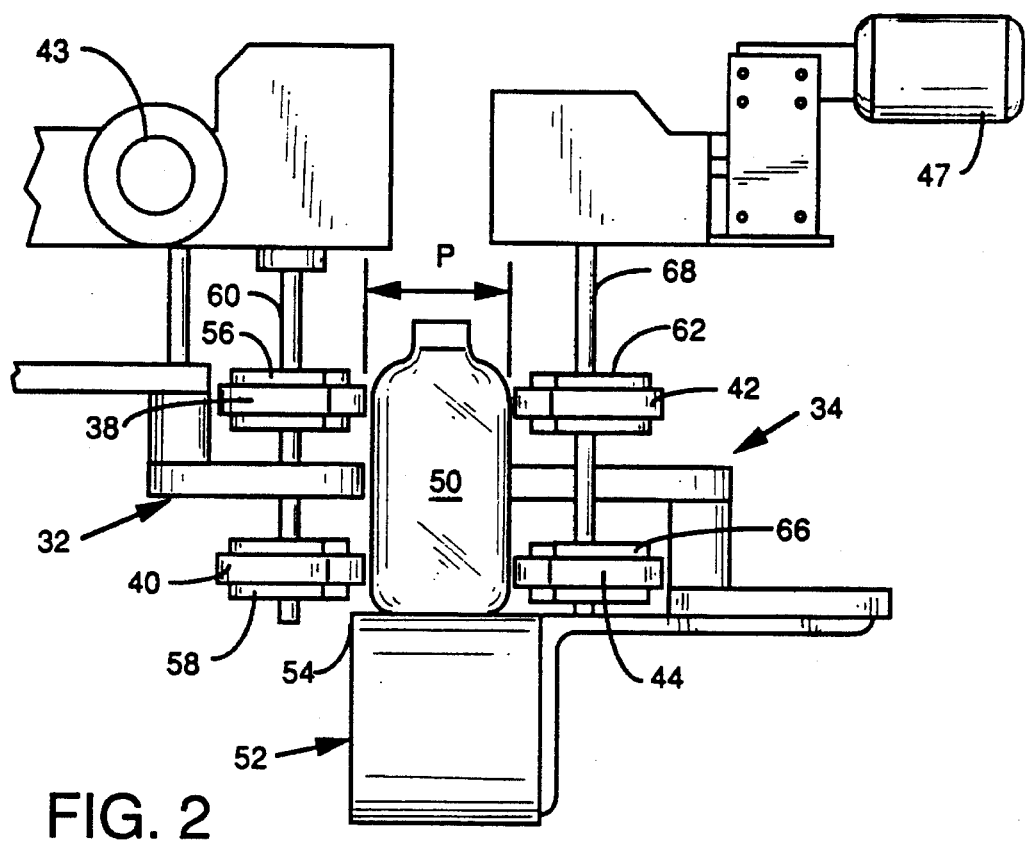
FIG. 2 is an elevational view showing a first embodiment of the present invention.
Figure 3:
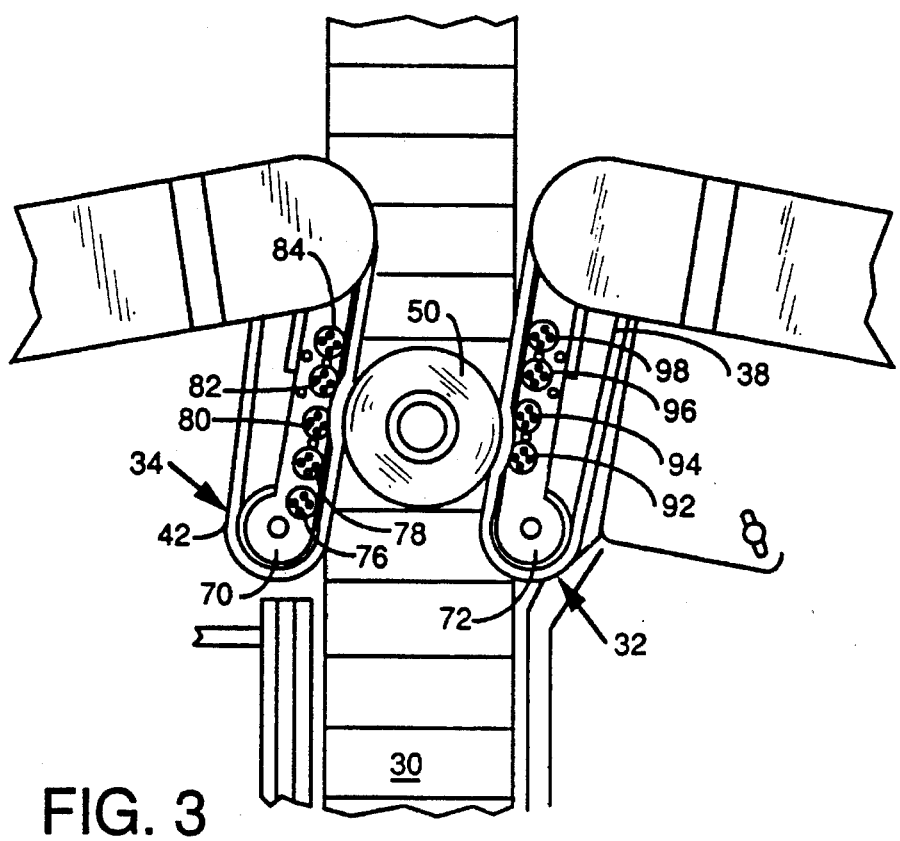
FIG. 3 is a top plan view partly in section of the first embodiment of container speed adjusting means.

Referring to FIGS. 2 and 3 which are respectively an elevational view and plan view of the first embodiment of the invention, the container 50 is passing through the path between two container speed adjusting units 32, 34. A space has been shown between the container 50 and the adjacent units 32, 34 solely for clarity of illustration. It will be appreciated, however, that the outer surface of the container 50 will be in contact with both of the units 32, 34 and, preferably, the width P of the path between units 32, 34 will preferably be about 5 to 15 percent less than the maximum external diameter of the container 50 which is passing therethrough. In a preferred approach, the container will effect about ⅛ inch compression of each speed adjusting unit 32. The conveyor bed 52 underlying conveyor 54 which, in the form shown, will be moving the container 50 to the units 32, 34. As shown in FIGS. 1 and 2, belts 38 and 40 of container speed adjusting unit 32 are relatively vertically spaced from each other and are supported by and secured to respectively primary pulleys 56, 58 which, in turn, are fixedly secured to shaft 60 which is driven by motor 43. Similarly, belts 42, 44 are supported by and secured to pulleys 62, 66 which, in turn, are fixedly secured to shaft 68 which is driven by motor 47.

Referring to FIG. 3, a second primary pulley 70 is disposed adjacent to an end of belt 42 as an idler pulley which supports the belt. Similarly, a second primary pulley 72 is in supporting contact with upper belt 38. Disposed within the belt 42 and mounted for rotational movement therewith are a plurality of secondary resiliently compressible pulleys 76, 78, 80, 82, 84 which are shown within unit 34 disposed adjacent to the portion of the belt 42 which contacts the container. Similarly, a series of secondary pulleys 92, 94, 96, 98 are disposed within the belt 38 in resiliently compressible contact with the belt 38 adjacent to the portion of the belt 38 which contacts the containers. It is preferred that the secondary pulleys contact the respective belts to provide resilient support therefor, but that they not contact the containers. While no specific number of secondary pulleys 76, 78, 80, 82, 84, and 92, 94, 96, 98 need be employed, it is generally preferred to employ about 2 to 6 such pulleys having an outer diameter measured at the major dimension of about ¾ inch to 3 inches and, most preferably, about 1 inch to 2 inches.

It will be appreciated that the belt 38 on one side of the path of travel will preferably orbit at the same speed as belt 42 for effective container handling.

Figure 4:
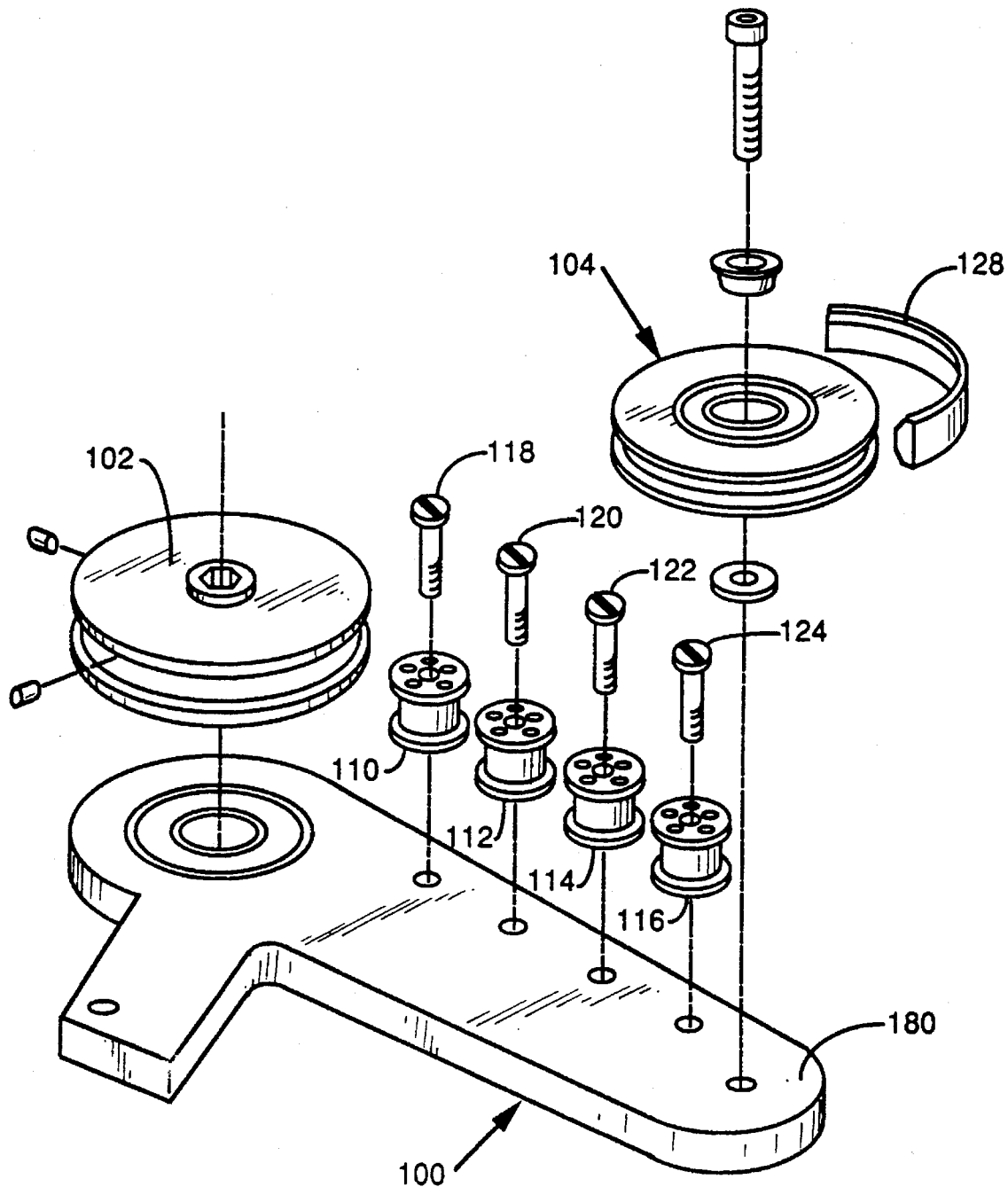
FIG. 4 is an exploded view of a portion of the container speed adjusting apparatus of FIGS. 2 and 3.

Referring to FIG. 4, there is shown an exploded view of a container speed adjusting means arm 100 with the associated primary pulleys 102, 104. A plurality of axially rotatable resiliently compressible secondary pulleys 110, 112, 114, 116 and their associated fasteners which may be fasteners 118, 120, 122, 124 having suitable threaded portions engageable within threaded bores in arm 100, but having generally cylindrical surfaces passing through the central opening of the pulleys 110–116 (even numbers) to facilitate axial rotation of pulleys 110, 112, 114, 116. It will be appreciated that with one of the primary pulleys 102, 104 being driven and the other idling, belt 128 will be subjected to orbital movement and will be received within the annular recesses of pulleys 102, 104. Pulleys 110, 112, 114, 116 engage the inner surface of belt 128 to provide resiliently compressible support therefor. Resultant resilient interaction of the container and resiliently supported belt 128 will compress portions of secondary pulleys 110, 112, 114, 116 and result in reduction of both the translational speed and rotational speed of the containers.

Figure 5:
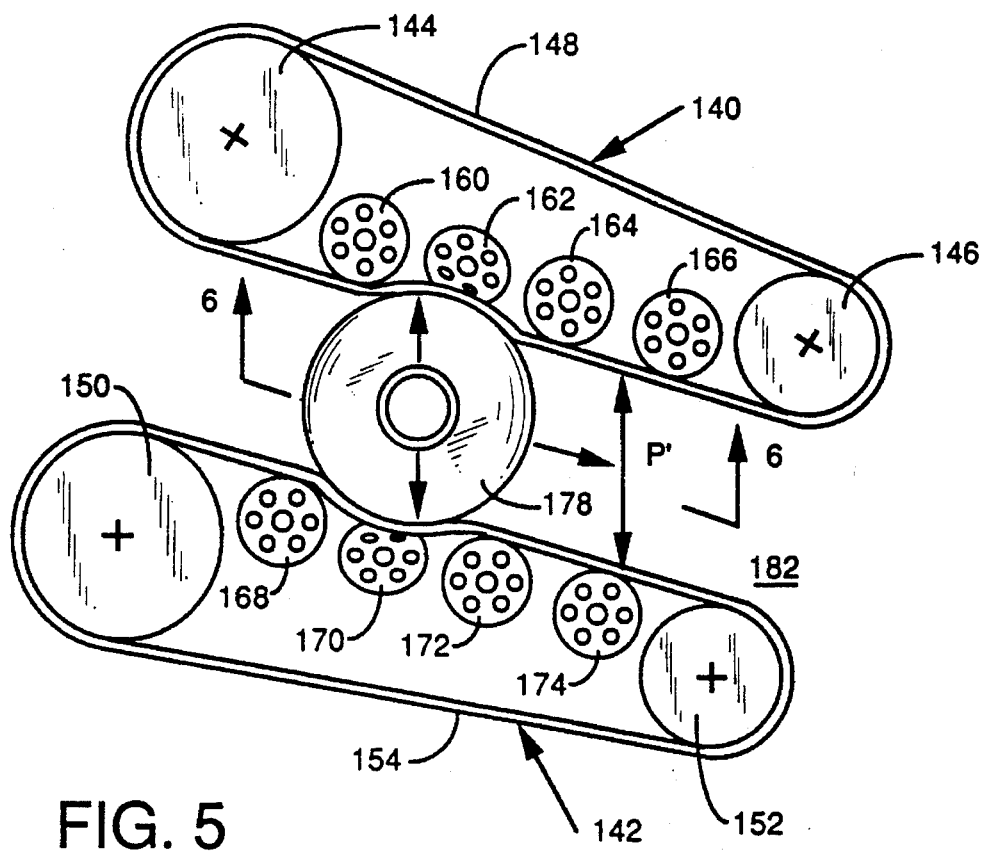
FIG. 5 is a partially schematic plan view showing two cooperating container speed adjusting apparatus units of the first embodiment of the present invention.
Figure 6:
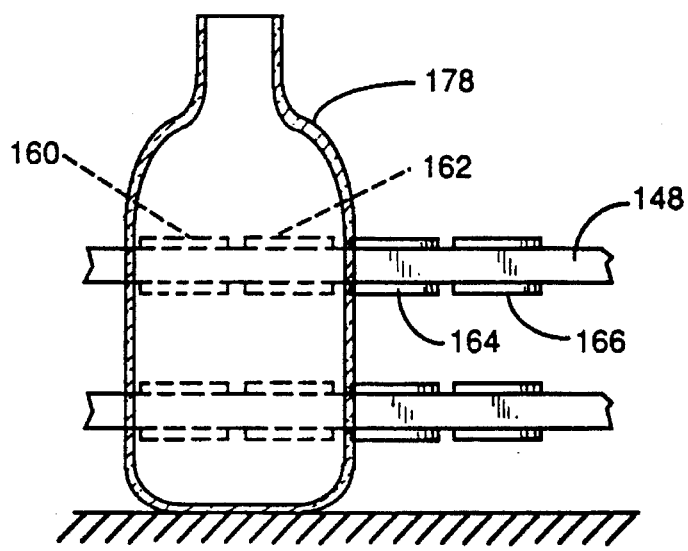
FIG. 6 is a cross-sectional illustration taken through 6—6 of FIG. 5.

A further embodiment of the present invention is shown in FIGS. 5 and 6. A pair of container slowdown units 140, 142 each have a pair of primary pulleys 144, 146 disposed adjacent to the ends of endless belt 148, and primary pulleys 150, 152 disposed adjacent the ends of endless belt 154. It will be appreciated that in a preferred form, a similar construction will underlie each of these assemblies so as to provide two orbiting belts with each unit 140, 142. Each unit 140, 142 has respectively a plurality of resiliently compressible axially rotatable secondary pulleys 160, 162, 164, 166 and 168, 170, 172, 174. It will be noted that the container which, in the form shown, is a bottle 178 has a diameter greater than the width P' of the path 182 and, therefore, has belts 148, 154 urged transversely outwardly against the resistance of the compressive secondary pulleys 162, 164, 166, 168, 170, 172. The resiliently compressible elements of the present invention, such as the secondary pulleys 160–174 (even numbers only) are preferably made of an elastomeric material or rubber and, most preferably, are made of rubber, polyurethane or silicone. A preferred polyurethane will have a durometer hardness of about 60 to 70.

Figure 7:
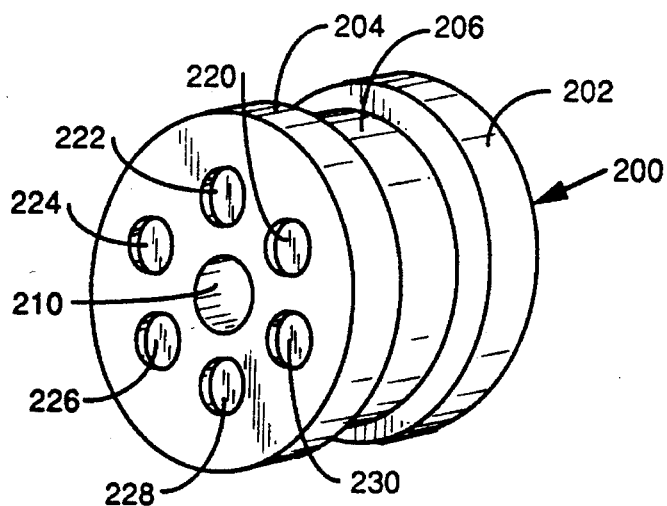
FIG. 7 shows, in perspective, a form of secondary resiliently compressible pulley of the first embodiment of the present invention.
Figure 8:
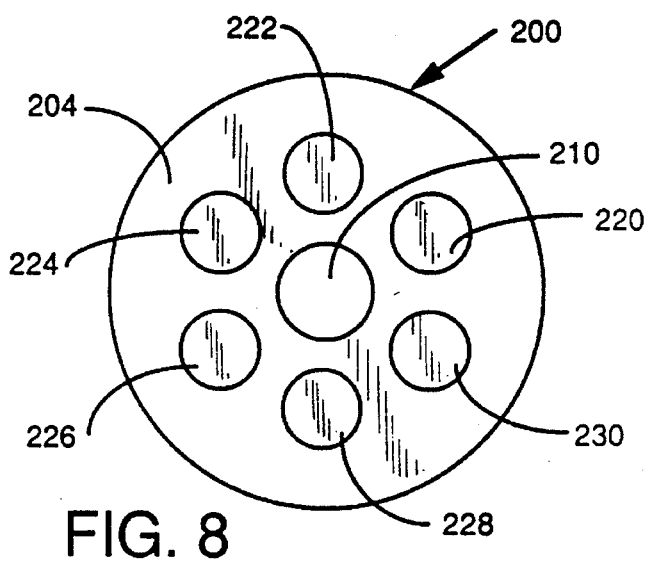
FIGS. 8 and 9 respectively show a front-elevational view and right-side elevational view of the pulley of FIG. 7.
Figure 9:
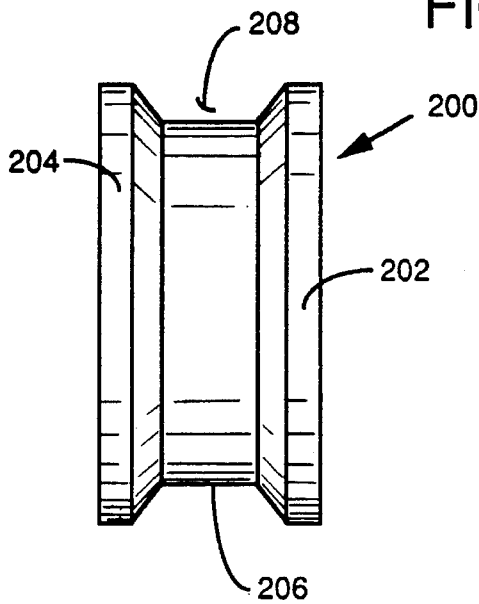

Referring to FIG. 7 through 9, a secondary pulley of the present invention which, in addition to having its inherent compressive resiliency, also has certain preferred additional features of the present invention. The pulley 200 has a pair of sidewalls 202, 204 connected by a suitable connecting element 206 and may be formed as a unitary molded article. The pulley has an annular recess 208 structured to receive the orbiting endless belt. In the form shown, the pulley has not only fastener receiving central bore 210 for securement to the container speed slowdown unit, but also has in each wall 202, 204, a plurality of weakened zones 220, 222, 224, 226, 228, 230 which, in the form shown, are recesses which do not pass completely through the walls. These recesses 220–230 (even numbers only) preferably have centers equidistant from the center of bore 210 and enhance the resilient compressibility of pulley 200. The recesses preferably have a diameter of about ⅛ inch to ½ inch.

Figure 10:
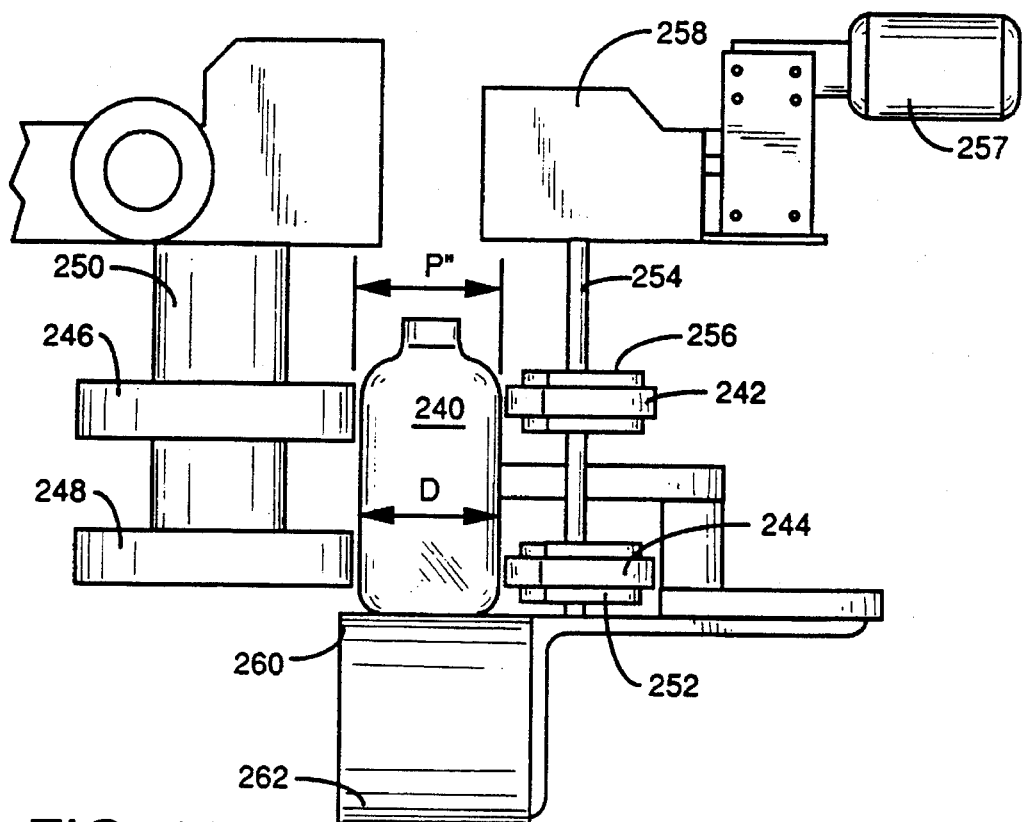
FIG. 10 is an elevational view of another embodiment of the present invention wherein the two container speed adjusting units employ different resiliently compressible means.
Figure 11:
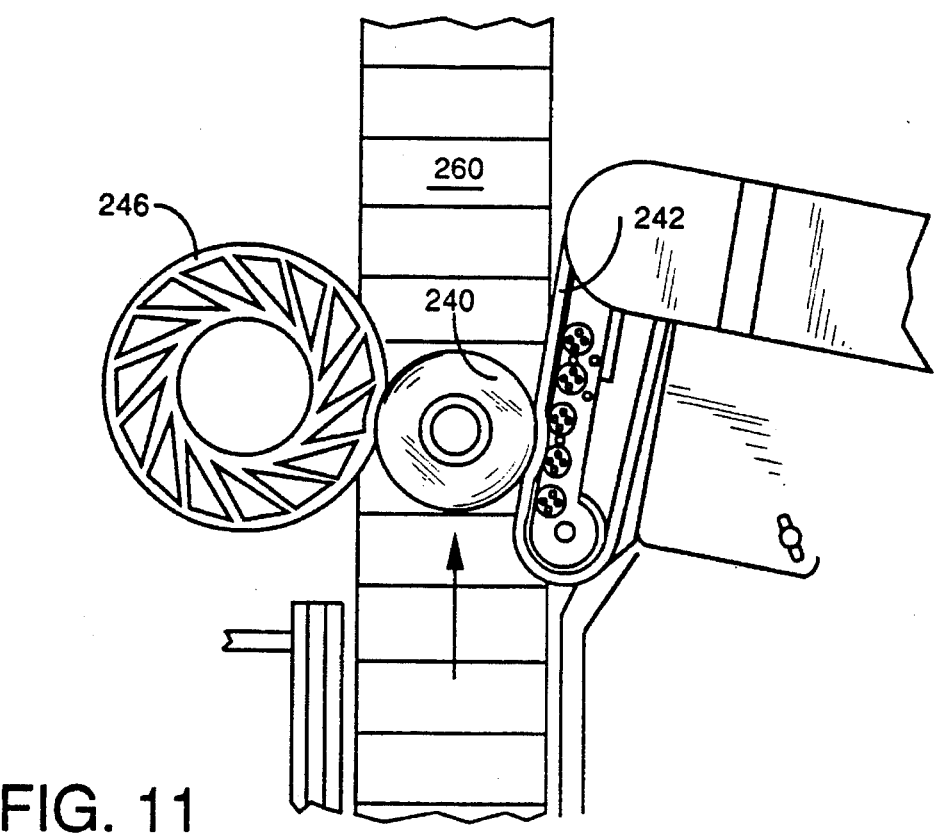
FIG. 11 is a top plan view of the apparatus of FIG. 10.
Figure 12:
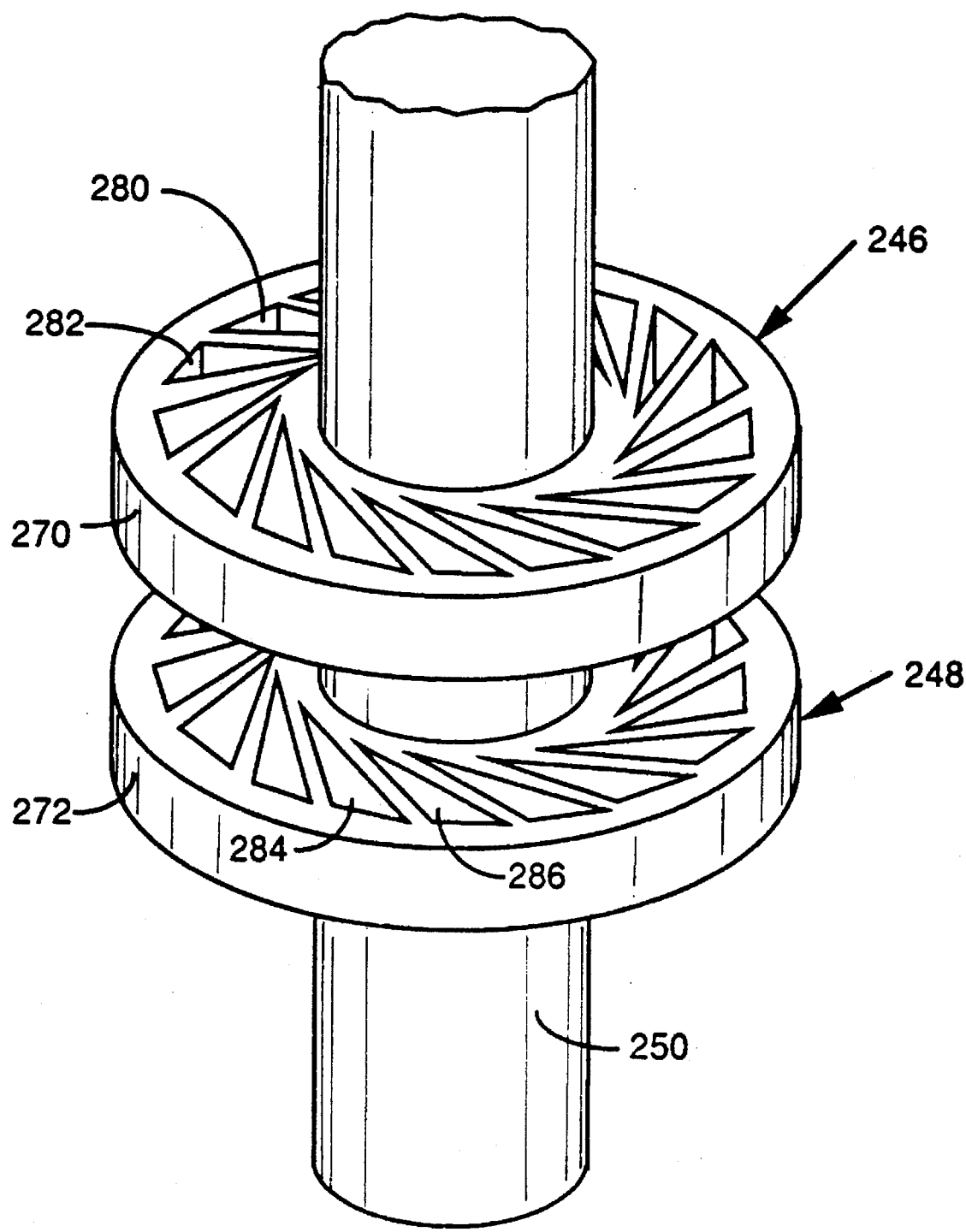
FIG. 12 illustrates a perspective view of a pair of resiliently compressible wheels employable in the embodiment of FIGS. 10 and 11.

Referring to FIGS. 10 through 12, a further embodiment of the invention will be considered. In this embodiment, the container 240 moves in a direction into the page under the influence of endless belts 242, 244, which are supported on pulleys 252, 256, which are fixedly secured to rotatable shaft 254, which is driven by motor 257 through guard means 258. The belt assembly may be an assembly similar to that employing the resiliently compressible secondary pulleys of the first embodiment of the invention. On the other side of the conveyor 260 are a pair of resiliently compressible wheels 246, 248 which are vertically spaced and fixedly mounted on rotatable shaft 250. It will be appreciated that rotation of shaft 250 in a first direction will cause of rotation of the wheel in the same direction as the container 240 is traveling. Conveyor 260 is driven by appropriate means contained within conveyor bed 262. The wheels 246, 248, as shown in FIG. 12, are annular in configuration and have a shaft 250 passing therethrough and secured thereto. The wheels 246, 248, respectively, have outer surfaces 270, 272 which engage the outer surface of container 240 and deform as shown in FIG. 11. For convenience of illustration, while a gap has been shown between the container and the container speed adjusting means in FIG. 10, it will be appreciated that the space P" between the belts 242, 244 and the wheels 246, 248 will be less than the external diameter D of container 240 to facilitate compression of wheels 246, 248 due to contact with container 240. In order to enhance the resilient compressibility of the wheels 246, 244, each is provided with a plurality of weakened zones, such as zones 280, 282, and the others in wheel 246 and weakened zones 284, 286 and others in wheel 248. These weakened zones, in the form shown, are not holes, but rather are a plurality of generally triangular recesses having base of the triangle disposed adjacent the outer peripheries 270, 272 of the wheels. This facilitates enhanced compressibility of the wheels. It will be appreciated that, if desired, in lieu of using two wheels 246, 248, a single wheel having the height suitable to establish the desired area of surface-to-surface contact between the wheel periphery and container 240 may be employed.

Figure 13:
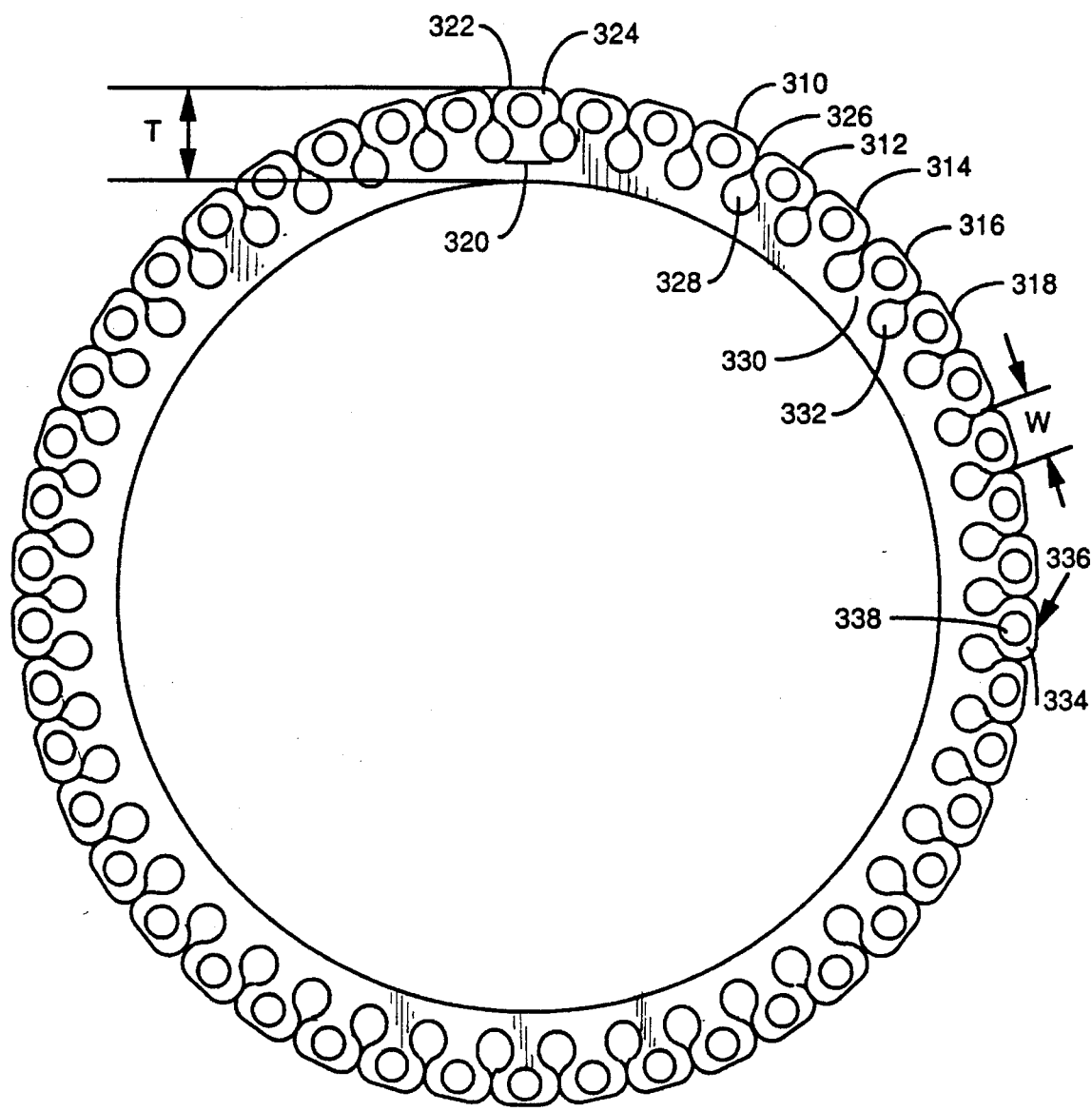
FIG. 13 is a top plan view of a belt illustrating several features of the present invention.
Figure 14:
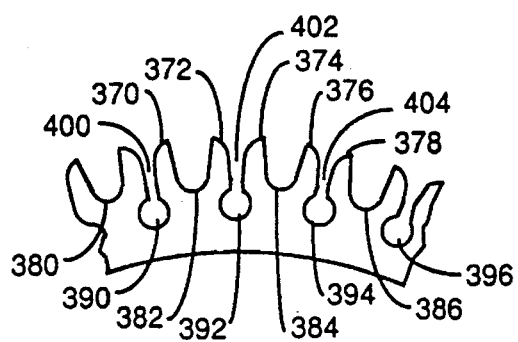
FIG. 14 is a fragmentary view of a modified form of resiliently compressible belt.

Referring to FIGS. 13 and 14, another embodiment of the invention will be considered. In this embodiment, the use of a uniquely configured endless belt as a substitute for the conventional endless belt is provided. While these figures show several different configurations which facilitate enhanced resilient compressibility, any one of these features or any combination thereof may be employed if desired. In general, it will be preferred to provide a belt which adopts a singular construction throughout. Referring to the endless belt shown in FIG. 13, it will be noted that the belt has resiliently deformable portions created by the use of a plurality of generally radially outwardly projecting elements 310, 312, 316, 318. The projecting elements 310, 312, 314, 316, 318 are cantilevered from a radial position 320 which is more than 50 percent and, preferably, more than 70 percent of the radial thickness T of the belt from the end 322 of the projection 324. Adjacent projections, such as 310, 312 have a restricted throat entrance 326 which communicates with an enlarged opening 328. The projection, therefore, has a larger circumferential width W adjacent the free end thereof than in the portion 330 adjacent to opening 332. For additional compressive resiliency, the radially outer enlarged portion 334 of a projection, such as 338, has a weakened zone 338 which, in the form shown, is a hole 338. In the illustrated preferred form, the projections, such as 310, 312, 314, 316, 318 are generally mushroom-shaped with the holes having a smaller area than the area of opening 332. The belt is preferably of uniform configuration throughout its circumference. It will be appreciated that compressibility is provided both by the elastomeric material out of which the belt is made such as a urethane material, for example, as well as the use of the projecting elements and associated gaps.

Figure 15:
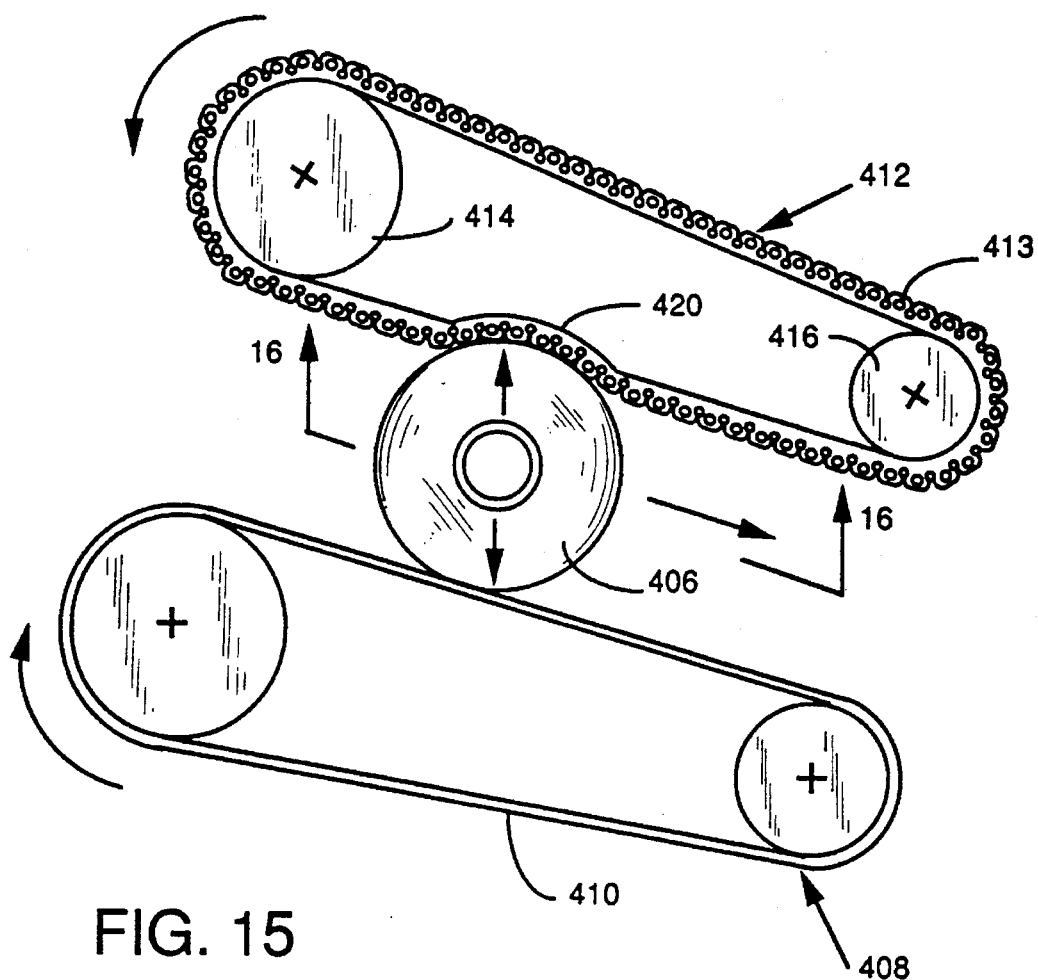
FIG. 15 is a top plan view of a belt having features of the type shown in FIGS. 13 employed in one container speed adjusting unit cooperating with another speed adjusting unit.
Figure 16:
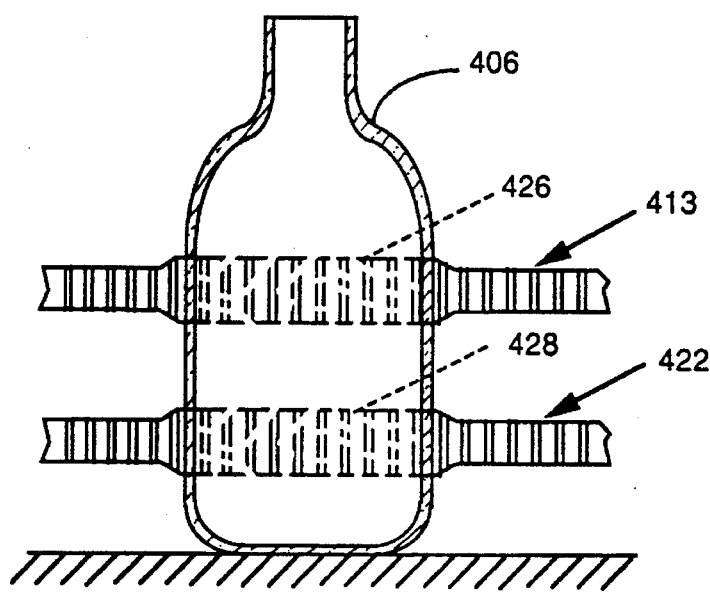
FIG. 16 is cross-sectional illustration through 16—16 of FIG. 15 showing the container in contact with the elastomeric belt.

By providing the construction of FIGS. 13 or 14 throughout the endless belt, as shown in FIGS. 15 and 16, enhanced compressibility of the container speed adjusting means will be provided. In FIG. 15, a container 406 is shown in contact with a first container speed slowdown unit 408 which has a conventional belt 410 and belt 413, both of which are orbiting in the direction indicated by the arrows. The arrows shown on the container 406 represent the lateral forces exerted by container 406 on belts 410, 413. Unit 412 has a pair of primary pulleys 414, 416 with at least one of them being driven so as to create orbital movement of the belt 413 in the direction shown by the arrow to correspond to the movement of container 406 in the direction shown by the arrow. It will be noted that the portion 420 of belt 413, which is in contact with container 406, has been resiliently deformed by container 406 with the zone of deformation progressing along belt 413 as the container moves in the direction of the arrow. Belt 410 is subjected to little or no deformation. As shown in FIG. 16, a belt 422, which may be identical to belt 413, is disposed in spaced underlying relationship with respect thereto. Regions 426, 428 of the bolts 426, 428 are the portions deformed by container 406.

Looking at the portion of FIG. 14, an alternate form of resiliently deformable means is provided by generally radially outwardly directed tapered projections 370, 372, 374, 376, 378 with the associated interposed gaps 380, 382, 384, 386 which also contribute to the resilient deformability of the belt. In this instance, the gaps 380–386 (even numbers only) are of greater width than the projections 370–378 (even numbers only). Alternate weakened zones 390, 392, 394, 396 have enlarged holes which are disposed radially inwardly of the restricted throats, such as throat openings 400, 402, 404. The result are alternate radially outwardly open recesses with the first type having a lesser radial depth than the radial depth of a second type. It will be appreciated that these structures may be employed throughout the circumference of the belt in lieu of the previously described projections and gaps of FIG. 13.

Figure 17:
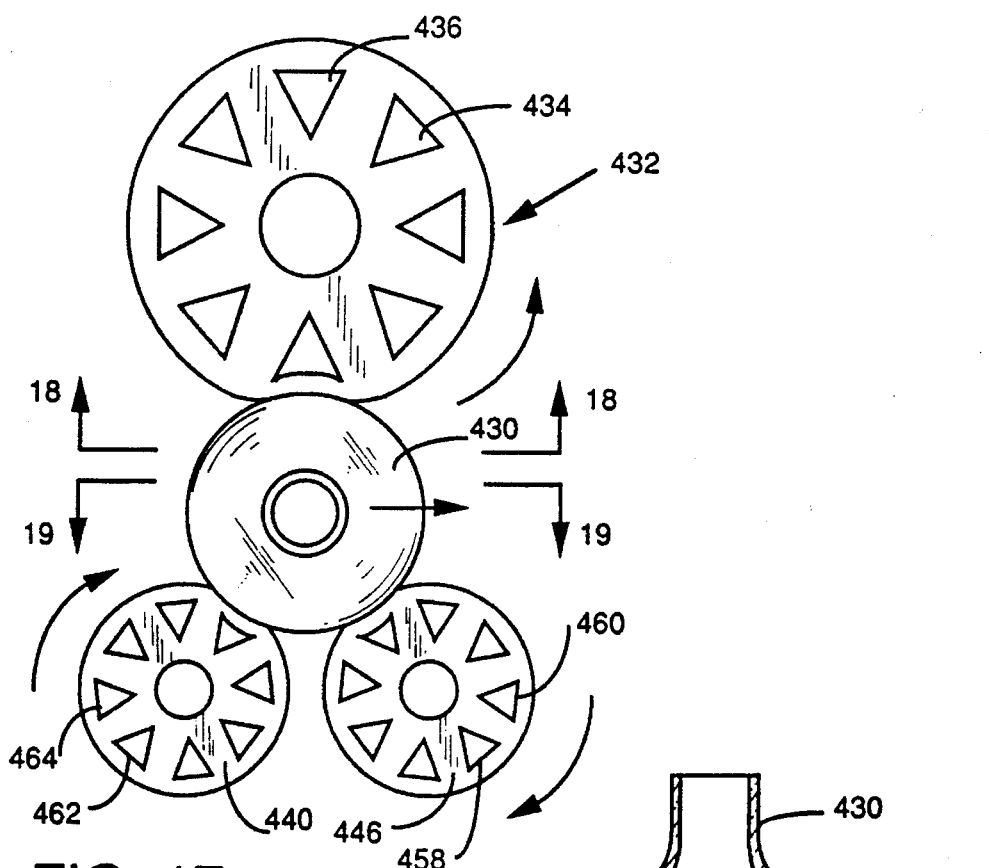
FIG. 17 is a top plan view of a further embodiment of the invention employing resiliently compressible wheels in both container speed adjusting units.
Figure 19:
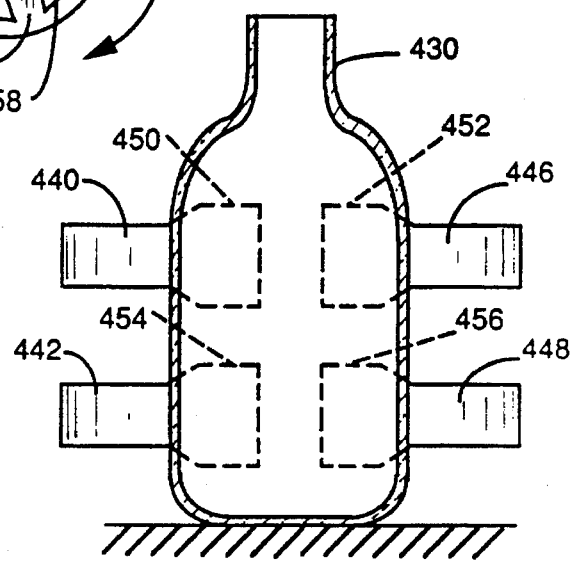
FIG. 19 is a cross-sectional illustration taken through 19—19 of FIG. 17.
Figure 18:
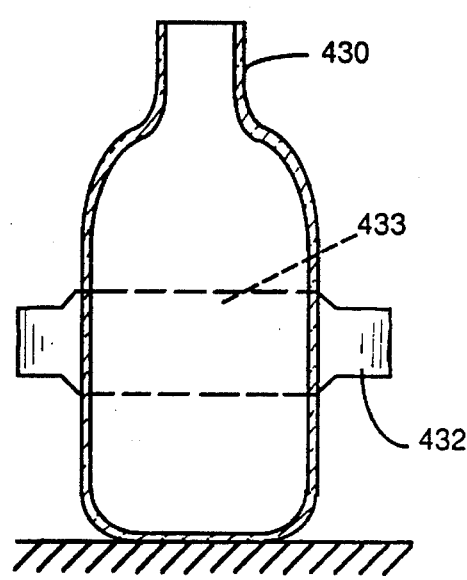
FIG. 18 is a cross-sectional illustration through 18—18 of FIG. 17.

Considering another embodiment of the invention, reference is made to FIGS. 17 through 19 wherein a container 430 is in contact with resiliently compressible wheel 432 which has a plurality of weakened portions, such as 434, 436, for example, which may take the form of (a) reduced thickness zones or (b) openings passing entirely through the wheel 432. It will be noted that wheel 432 is a unitary wheel which serves as one container speed adjusting means. On the other side of the container 430 are two pairs of wheels 440, 442 which are relatively spaced and generally coaxial with respect to each other and wheels 446, 448 which are relatively coaxial and vertically spaced from each other. The portions of wheels 440, 442, 446, 448 which are in contact with container 430 have deformed portions 450, 452, 454, 456 as shown in FIG. 19. Also, wheel portion 433 of wheel 432 is similarly deformed. Wheels 440, 446 also have weakened sections, as exemplified by 458, 460, 462, 464, for example. While it is preferred that the weakened sections in wheels 432, 440, 446 be openings passing completely through the wheels, an alternate and also preferred approach would be to have the weakened zone have a reduced thickness of about 25 to 75 percent of adjacent full thickness portions of the wheels.

It will be appreciated that while for purposes of illustration reference has been made hereto to bottles made of glass or plastic, the invention is equally applicable to metal containers, such as metal cans, composite containers and containers intended for a wide variety of end uses, including, but not limited to beverage containers, pharmaceutical containers, and containers for liquid, solid and semi-solid products.

It will be appreciated that the present invention has provided a means for enhancing the durability, efficiency and performance characteristics of container speed adjusting means and particularly container slowdown apparatus. This is accomplished in a manner which is consistent with prior art constructions for such systems, but provides improvements therein through the use of resiliently compressible materials and, where desired, certain enhancements thereto, such as weakened zones, openings, and belt modifications, such as generally radially outwardly projecting elements. Various combinations of these features may be employed.

Whereas particular embodiments of the invention have been described above, for purposes of illustration, it will be evident to those skilled in the art that numerous variations of the details may be made without departing from the invention as defined in the appended claims.

We claim:

1. Container handling means comprising container speed adjusting means, drive means for sequentially delivering a plurality of said containers into contact with said container speed adjusting means, said container speed adjusting means having endless belt means for contacting said containers, pulley means disposed within and supporting and engaging said belt means, said pulley means including a plurality of primary pulleys disposed within said belt means adjacent ends thereof and having at least one of said primary pulleys driven, said pulley means including a plurality of resiliently compressible secondary pulleys to provide shock absorption and support for said belt means, said container speed adjusting means having a first speed adjusting unit and a second speed adjusting unit spaced from said first speed adjusting unit with a path for travel of said containers disposed therebetween, said path of travel having a container entry and a container exit, and said container speed adjusting means having means for altering the speed of travel of said containers as they move from said container entry to said container exit.

2. Container handling means comprising container speed adjusting means, drive means for sequentially delivering a plurality of said containers into contact with said container speed adjusting means, said container speed adjusting means having endless belt means for contacting said containers, pulley means disposed within and supporting and engaging said belt means, said pulley means including a plurality of primary pulleys disposed within said belt means adjacent ends thereof and having at least one of said primary pulleys driven, said pulley means including a plurality of resiliently compressible secondary pulleys to provide shock absorption and support for said belt means, said container speed adjusting means having a first speed adjusting unit and a second speed adjusting unit spaced from said first speed adjusting unit with a path for travel of said containers disposed therebetween, said first speed adjusting unit having belt means with two vertically spaced endless belts, and said second speed adjusting unit having resiliently compressible wheel means, whereby containers contacting said first speed adjusting unit and said second speed adjusting unit will resiliently compress said units.

3. The container handling means of claim 2 including said wheel means including a relatively vertically spaced pair of resiliently compressible wheels.

4. The container handling means of claim 2 including said second unit wheel having a plurality of weakened zones defined by at least one type of weakened portion selected from the group consisting of thinned portions and openings.

5. The container handling means of claim 4 including said wheels being axially rotatable.

6. The container handling means of claim 4 including said wheel means consisting of a unitary axially rotatable wheel.

7. The apparatus of claim 2 including said path of travel having a container entry and a container exit, and said container speed adjusting means having means for altering the speed of travel of said containers as they move from said container entry to said container exit.

8. The apparatus of claim 7 including said container speed adjusting means having means for effecting said speed alteration by reducing the speed of travel of said containers between said container entry and said container exit.

* * * * *

UNITED STATES PATENT AND TRADEMARK OFFICE
CERTIFICATE OF CORRECTION

PATENT NO. : 5,573,103
DATED : November 12, 1996
INVENTOR(S) : JOHN NOVAK and LLOYD STIVISON It is certified that error appears in the above-indentified patent and that said Letters Patent is hereby corrected as shown below:

In column 3, line 60, "modem" should be --modern--.

Signed and Sealed this

Twenty-eighth Day of October, 1997

Attest:

BRUCE LEHMAN

Attesting Officer

Commissioner of Patents and Trademarks